Aug. 30, 1927.
R. W. SAMPSON
1,640,618
PNEUMATIC CUSHION, MATTRESS, AND THE LIKE
Original Filed April 23, 1925
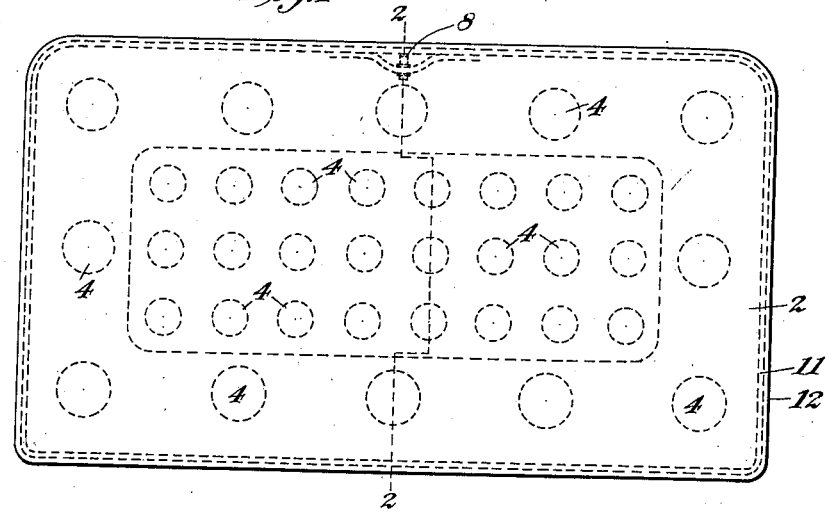
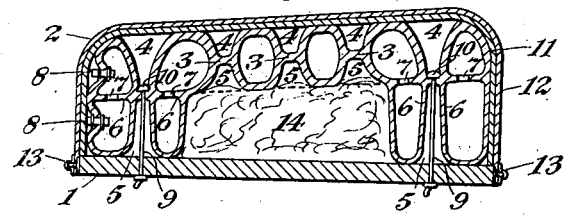
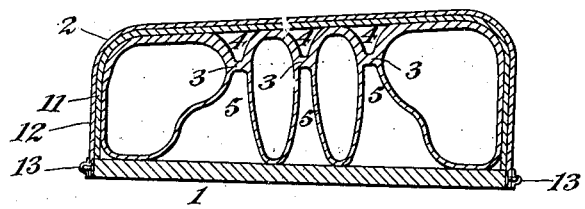
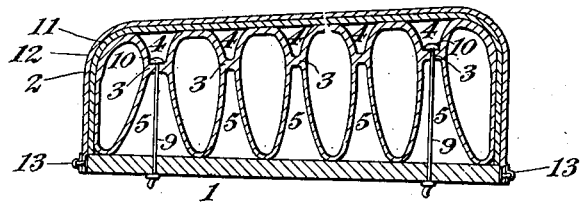
INVENTOR,
Robert W. Sampson.
BY Andrew Wilson,
ATTORNEY.

Patented Aug. 30, 1927.

1,640,618

UNITED STATES PATENT OFFICE.

ROBERT W. SAMPSON, OF NEW YORK, N. Y., ASSIGNOR TO SAMPSON MARTIN CORPORATION, OF NEW YORK, N. Y., A CORPORATION OF DELAWARE.

PNEUMATIC CUSHION, MATTRESS, AND THE LIKE.

Application filed April 23, 1925, Serial No. 25,181. Renewed December 30, 1926.

My invention relates to pneumatic cushions, mattresses, and similar articles, adapted to be used as supports for the human body in sitting or reclining, particularly to cushions of the class which are intended as equipment for conveyances such as automobiles, sleeping cars and the like, wherein there is considerable jar or movement of the structure carrying the cushion, and it is important to have the response and reaction of the elasticity of the cushion properly adjusted so as to make it a comfortable support to the user, protecting him from excessive shock and jar, while, at the same time, the fluctuation of the compressed air within the cushion does not so change its shape and contour as to render its support of the user undependable or uncertain.

The principal object of my invention is to give to the seat or carrying portion of such a cushion flexibility and elasticity, due not only to the elasticity of the confined air, but also to the fact that the seat portion of the cushion lies in whole or in part free of the base by which the cushion is carried, the seat being carried by a surrounding frame-like portion of the cushion, so that the weight of the user may cause the seat portion of the cushion to give as a whole instead of being sustained by a directly contacting base.

Another object of my invention is to reinforce or strengthen the material of which the central or seat portion of the cushion is made so as to strengthen that portion and make it more durable and less likely to distortion or damage, while, at the same time, it is supported by lighter and more flexible, inflated, portions of the cushion, thus increasing the stability of the seat portion while maintaining the advantages of its elastic support.

Another object of my invention is to anchor the cushion in a convenient way to a supporting base.

And still another object of my invention is to provide a suitable covering, such as may be detachable, and as part and serving with the pneumatic element and the base in making up, in the form of a unitary assembly, a complete seat cushion or the like.

In the drawings Fig. 1 is a plan view of a cushion, such as an automobile cushion, illustrating an embodiment of my invention; Fig. 2 is a cross sectional view of the same, taken on the line 2—2 of Fig. 1, looking to the right; and Figs. 3 and 4 are cross sectional views illustrating modifications.

In all the figures similar parts are designated by similar reference numerals.

A substantially rigid base 1 is employed to sustain the pneumatic casing 2, which, in this case, is intended to be molded to the general size and proportion of an automobile cushion, the material of the upper and under sides being drawn together at intermediate points and merged into connecting, stabilizing diaphragms 3, 3, 3, on either side of which are cup-like recesses or openings 4, 4, 4, 5, 5, 5, extending out to the opposed surfaces of the cushion.

Preferably, the lower portions of the casing 2, below the diaphragms, are made thinner and more flexible than the upper portions, which are made thicker in order to stiffen the upper face of the cushion and to give the effect of a somewhat stiffened carrying surface supported by a more yieldable and flexible under portion.

In the form shown in Fig. 2 I prefer, also, to make the central portion of the underside of the cushion below the diaphragms 3, 3 thicker than the lower portions of the casing, for the purpose of still further reinforcing the central section of the seat and giving to that comparatively thin portion an increased stiffness as a whole, so that this central portion will, in practice, have sufficient stiffness to prevent, in ordinary use, its being collapsed or bent down too far for convenient use within the enlarged marginal elements of the cushion.

A web or diaphragm 6 may be extended quite across the casing, for instance as a continuation of the bottom of the central, seat portion, as shown in Fig. 2.

This web serves to strengthen the cushion against lateral or longitudinal deformation when in use; as it resists the bulging out of the sides and ends of the cushion. It may be provided with open passages, as 7, 7, therethrough, to allow the free circulation of the confined air through it; or, if it is left imperforate, two valves 8, 8, may be provided, as shown in Fig. 2, so that the upper and lower sections of the casing may be independently inflated.

For the purpose of securely attaching the casing to the base, securing devices such as cords 9, 9 are fastened, as by anchors 10, 10 above diaphragms 3, to the base. This lashing of the cushion to the base tends to prevent the upsetting or turning in of the outer edge of the cushion under weight applied to its central portion.

If desired, a sheet of felt, or the like, 11, may be placed over the top and sides of the casing 2; and an outer covering 12 may be placed over the casing and secured to the base 1, preferably detachably, as by snap fasteners 13.

The central space beneath the casing in the form shown in Fig. 2, may, if desired, be filled with elastic fibre or similar material 14, which will act as a partial support for the casing in case of its accidental deflation.

In Fig. 3 I have shown a modification wherein the central portions of the cushion are carried down to the base 1, but the recesses 5, 5, are considerably enlarged, so as to diminish the area of support for this portion of the cushion and thereby increase its softness, although it will have more direct support than the form shown in Fig. 2.

In Fig. 4 I have shown still another modification wherein recesses are placed in the marginal portion of the casing 2 shown in Fig. 3, and securing devices are employed as shown in Fig. 2.

I desire it to be understood that the forms of embodiment of my invention shown in the drawings are to be considered as typical and not exclusive illustrations. For details of construction may be modified as by the use of equivalents without departing from the spirit of my invention as claimed.

Having thus described my invention, what I claim and desire to secure by Letters Patent of the United States is:—

1. A pneumatic cushion, embodying a hollow, inflatable marginal supporting rim, and and a hollow, inflatable seat portion having its bottom supported by the rim above the plane of the bottom of said rim.

2. A pneumatic cushion, embodying a hollow, inflatable marginal supporting rim, and a hollow, inflatable internally bridged, seat portion having its bottom supported by the rim above the bottom of said rim.

3. A pneumatic cushion, embodying a hollow, inflatable marginal supporting rim, and a hollow, inflatable internally stiffened, seat portion having its bottom supported by the rim above the bottom of said rim.

4. A pneumatic cushion, embodying a hollow, inflatable marginal supporting rim, and a hollow, inflatable seat portion having its opposite sides united at medial points and having its bottom supported by the rim above the plane of the bottom of said rim.

5. The combination with a pneumatic cushion, embodying a hollow, inflatable marginal supporting rim, and a hollow, inflatable seat portion, having its bottom supported by the rim above the plane of the bottom of said rim, of a base, and resilient material interposed between said seat portion and said base.

6. The combination with a pneumatic cushion, embodying a hollow, inflatable marginal supporting rim, and a hollow, inflatable seat portion, having its bottom supported by the rim above the plane of the bottom of said rim, of a base, and means for anchoring the marginal element against inward collapse.

7. The combination with a pneumatic cushion, embodying a hollow, inflatable marginal supporting rim, and a hollow, inflatable seat portion, having its bottom supported by the rim above the plane of the bottom of said rim, of a base, and a covering for the pneumatic cushion having a readily detachable attachment to the base.

ROBERT W. SAMPSON.